United States Patent [19]

Livshitz et al.

[11] Patent Number: 5,202,930
[45] Date of Patent: Apr. 13, 1993

[54] HIGH PRECISION ON-LINE SIGNATURE DYNAMIC VERIFICATION SYSTEM

[76] Inventors: Alexander Livshitz; Ruth Shraiman, both of 1475 Folsom, Apt. 378, Boulder, Colo. 80303

[21] Appl. No.: 683,533

[22] Filed: Apr. 9, 1991

Related U.S. Application Data

[63] Continuation-in-part of Ser. No. 402,875, Sep. 5, 1989, abandoned.

[51] Int. Cl.$^5$ .......................... G06K 9/00; G06K 9/46; G06K 9/66; G06K 9/36
[52] U.S. Cl. ....................................... 382/3; 382/13; 382/18; 382/41
[58] Field of Search ...................... 382/2, 3, 13, 18, 51, 382/20, 41, 49

[56] References Cited

U.S. PATENT DOCUMENTS 3,983,535 9/1976 Herbst et al. ............................ 382/3
5,040,222 8/1991 Muroya .................................... 382/3

Primary Examiner—David K. Moore
Assistant Examiner—Michael Cammarata
Attorney, Agent, or Firm—Donald W. Margolis

[57] ABSTRACT

On-line handwritten data verification, such as a signature, is obtained based on the comparison of the dynamics of a sample and a reference signatures by use of a new implementation of correlation function analysis. The dynamic data concerning scriber movement during the process of signature making is recorded and converted to digital form. Prior to correlation function analysis for evaluating a to-be-verified signature, reference signature dynamic data and to-be-verified signature dynamic data digital signals are pre-processed to eliminate time distortions. The compared signals are reduced to the same time scale, thereby providing a frequency coincidence between the signals. In order to eliminate the phase distortions, a "sliding window" mechanism is used to establish the mapping between phase coincident regions of the reference and of the to-be-verified signals. Then the multi-dimensional cross-correlation function analysis is applied to the pair of indivisible stationary signals. The sliding window mechanism provides two additional criteria to distinguish between authentic and forged signatures by determination of different characteristics of time distortions for such signals. The resulting measures of similarity are then compared with thresholds that have been selected to determine acceptance or rejection of the signature. The method and the apparatus can be applied for signature authentication in a wide variety of applications like security of physical access, computer network access, facsimile legalization, credit card industry, and many others.

13 Claims, 12 Drawing Sheets

Fig. 2 Two authentic signatures of a person

Fig. 3 Authentic signature and its free hand forgery

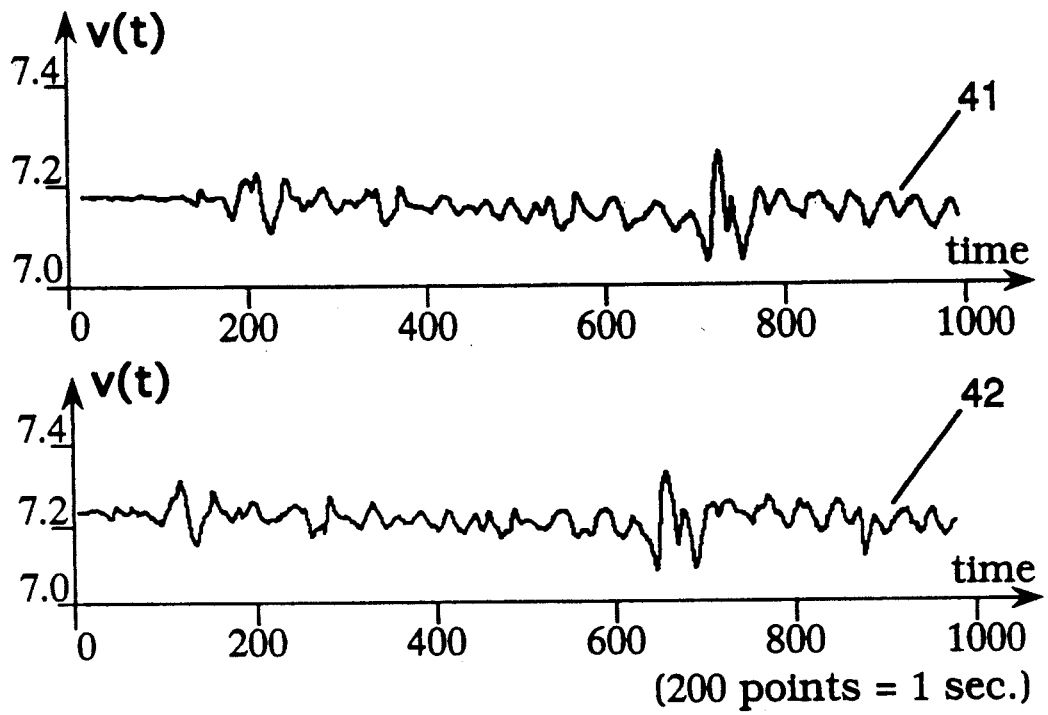
Fig. 4 Magnitude of scriber acceleration for the signatures shown in Fig. 2
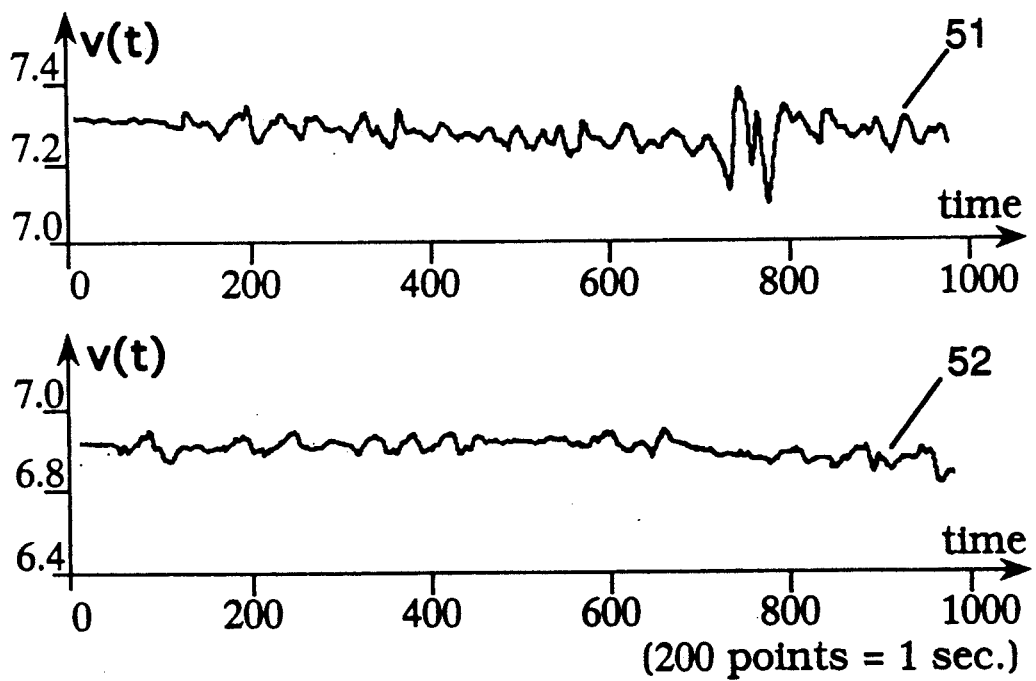
Fig. 5 Magnitude of scriber acceleration for the signatures shown in Fig. 3

Sliding window shift for the acceleration magnitude for the pair of authentic signatures in Fig. 4

Sliding window shift for the acceleration magnitude for the pair of an authentic and a forged signatures in Fig. 5

Combined Fig. 6a and Fig. 6b given in the same shift scale

Histogram of the first order differences
for sliding window shifts in Fig. 6a

Histogram of the first order differences
for sliding window shifts in Fig. 6b

Sliding window shift difference between components X and Y of acceleration with respect to the window number for the pair of authentic signatures Sliding window shift difference between components X and Y of acceleration with respect to the window number for the pair of authentic and forged signatures Combined Fig. 8a and Fig 8b in the same shift scale Histogram of the shift differences between sliding window shifts defined for X and Y components of scriber acceleration for the pair of authentic signatures Histogram of the shift differences between sliding window shifts defined for X and Y components of scriber acceleration for the pair of an authentic and a forged signatures

Graph of the window cross - correlation function (91) together with the phase shift (61)

HIGH PRECISION ON-LINE SIGNATURE DYNAMIC VERIFICATION SYSTEM

RELATED APPLICATION

This application is a continuation-in-part of U.S. patent application Ser. No. 402,875, filed Sep. 5, 1989, entitled DYNAMIC SIGNATURE IDENTIFICATION SYSTEM AND PROCESS, by Alexander Livshitz and Ruth Shrairman, which is now abandoned.

BACKGROUND OF THE INVENTION a. Field of the Invention

This invention relates to an automated on-line hand written data verification system, for example for high accuracy signature identification, based on scriber movement and data analysis using digital data comparison. More particularly, it relates to an identification system using hand written data, and which takes into account evaluation of the maximum value of cross-correlation function between to-be-verified and reference signature signals, as well as analysis of phase histograms relate to such signals.

b. Discussion of the Prior Art

The dictionary defines a signature as the name of a person written with his own hand. It is the one of oldest means used by people to signify authenticity, and still remains the primary means of authorization approval and authentication. The current electronic environment of computer networks, facsimile machines, and on-line data bases, coupled with movement towards a moneyless, paper-less, faceless society requires new and innovative ways to guarantee the authencity and validity of money and document transactions. One way to protect information is encryption which provides a certain amount of security. Modern encryption systems use a pair of encryption keys, a public encryption key and a private secret decryption key. However, should the private decryption key of an individual be learned by an unauthorized person, the system loses its security.

In the art, two basic machine method approaches to signature authentication process are known, the "method of templets" and the "correlation analysis method."

The method of templets uses a set of chosen feature values represented together with their tolerance levels and with corresponding weight coefficients. The features that represent the signature of a person usually exploit such characteristics as the average number of peaks, the position of the highest peak, the number of cross-overs at the zero reference, and the like, that is an image of the average signature dynamics as it used in the pattern recognition approach. Since the signature of a person is highly variable, it is very hard to find its invariant. This fact results in a reliability problem when using the method of templets for signature verification.

The correlation analysis method is more appropriate to the nature of the problem of comparison of signature dynamic signals. However, the correlation analysis method runs into difficulties because of the short length of the signals and the nonstationary character of the signals. Application of the correlation analysis method of signature verification is the subject of Herbst, et al. U.S. Pat. Nos. 3,983,535 and 4,128,829; and Gundersen U.S. Pat. No. 4,736,445. Each of these patents use a regional correlation analysis approach in order to eliminate "distortions of signals in the time axis", for example, see Gundersen U.S. Pat. No. 4,736,445, at Col. 1, lines 52-54. The method of the signal segmentation for cross-correlation analysis was first introduced by Herbst, et al U.S. Pat. No. 3,983,535, and was modified and supplemented by elements of spectrum analysis by Gundersen U.S. Pat. No. 4,736,445. In the reference, the evaluation of cross-correlation functions are done between small segments of corresponding to-be-verified and reference signature signals.

The segmentation in its last modification as taught by Gundersen is implemented by dividing the time signal segments between scriber lifts into short signature segments, each segment being at most 0.7 second in length, with the cross-correlation function being evaluted between corresponding pairs of sub-segments of a to-be-verified signature and of a reference signature. Similarity of the signals is measured by integral characteristics evaluated by using maximum correlation coefficients for all the sub-segment pairs, with special weight functions being used for penalizing any abnormal correlations within the very small overlapped area based on the information about the position of maximum correlation function. Such a segmentation analysis method has serious shortcomings. Splitting segments into sub-segments of very short length results in the considerable loss of useful authentic information. Computation of correlation functions on such short overlapping pieces of these sub-segments can not result in reliable evaluation and makes this measure statistically unstable. Furthermore, the subdivision of segments into very short sub-segments does not eliminate time distortions as it does not result in generation of phase-coincidental pairs of sub-segments from the reference signature and from the to-be-verified signature signals.

SUMMARY OF THE INVENTION

The present invention discloses a method and apparatus for use in on-line handwritten data verification, such as a signature, based on the comparison of the dynamics of a to-be-verified (sample) signature and of a reference signature by use of a new method for implementing of correlation function analysis. In the practice of the present invention, the dynamic data concerning forces, accelerations, velocities and the like, of a scriber, such as a pen, during the process of reference signature making is first recorded and then converted to digital form. This dynamic data can then be used as random signal vectors during the verification process, as taught herein below. Prior to the correlation function analysis for evaluating signal matching, both the reference signature dynamic data and the to-be-verified dynamic data signals are pre-processed to eliminate different kinds of time distortions, so that the signals can be compared as though both sets of data were stationary signals. More particularly, the compared signals are reduced to the same scale or to the same average velocity to adjust the frequency coincidence between the signals. In order to eliminate phase shifts, a special "sliding window" method, has been developed, as detailed below, which can be used to establish the mapping between phase coincident points of the reference and of the to-be-verified signals.

Additionally, the sliding window method allows one to determine a portion of first order differences of window shifts for each axis and differences of such shifts for any compared pair of axes which values are in the zero neighborhood which determination is appeared to be two powerful criteria to distinguish between authentic and forged signatures.

Then cross-correlation function analysis is applied to a pair of indivisible, apparently stationary, frequency and phase coincident signals. Such analysis may be implemented either for each vector component of written data signal separately, or for multidimensional signals as vectors. In the former implementation, the maximum cross-correlation function evaluated for each vector component is used to determine and measure similarity. In the latter, using multidimensional vectors, a norm or a trace of the cross-correlation matrix is used to determine and measure similarity.

The resulting measure of similarity, as determined by either such method of cross-correlation analysis, is then compared with a threshold that has been selected to determine acceptance or rejection of the signature; this criterion will be referred to as $Cr_1$. Therefore, as more precisely set forth below, verification criteria is calculated by evaluating complex criteria with regard for phase shift histograms and estimation of maximum value of cross-correlation function between to-be-verified and reference signals which both have been preprocessed to a corresponding pair of effectively stationary signals with frequency and phase adjustment. Phase shift analysis and correlation function analysis can be implemented either sequentially or in parallel.

The method and the apparatus of the present invention can be applied for signature authentication in a wide variety of applications, such as security for physical access, computer networks access, facsimile legalization, credit card industry, and many others.

These and other objects of the present application will become apparent to those skilled in the art from the following detailed description, showing the contemplated invention as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 2 shows a pictorial representation of two samples of an authentic signature, 22 and 23 which have been written by the same person at two different times;

FIG. 3 shows a pictorial representation of an authentic signature 31 as in FIG. 2, and of free hand forgery 32 of that signature which has been written by another person;

FIG. 4 shows the magnitude of acceleration during the process of scriber movement 41 and 42 for the two authentic signatures in FIG. 2;

FIG. 5 shows the magnitude of acceleration during the process of scriber movement, 51 and 52 respectively, for the authentic signature 31 and for the forged signature 32 shown in the FIG. 3;

DETAILED DESCRIPTION OF THE INVENTION

The present invention provides a machine method by which a digitized code of the signal picked up in the process of signature making can be considered as a personnel key which is both unique and which cannot be lost or forgotten. This key can be a signature. As used herein, a "signature" shall mean any specific handwritten text, and shall be used to include not only a signature, but any short handwritten text, or hieroglyph, or the like.

Figure 1:
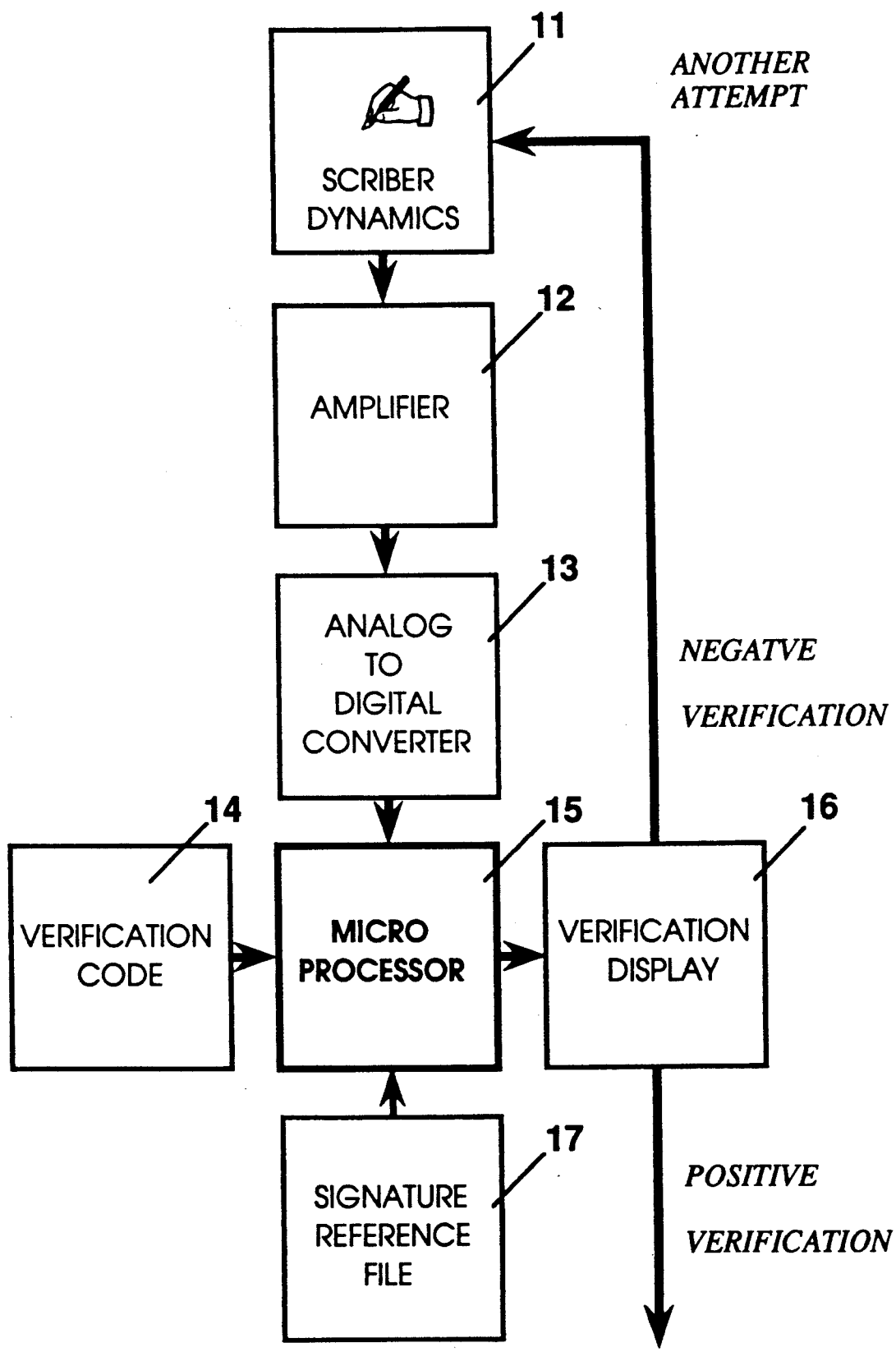
FIG. 1 is a schematic diagram showing the elements of the signature verification system of the present invention.

As it is shown in FIG. 1, in the process of signature making, or writing other data, a scriber 11 with enclosed sensors, not shown, produces analog signals, which are amplified by amplifier 12 and converted to digital signals by converter 13. The digital signals then go to processor 15 where, if they are original reference signals they are preprocessed and stored in the reference file 17. If the digital signals are from a to-be-verified sample signature they are compared with reference signature signals stored in the reference file 17 by use of verification code 14, as set forth in detail below. The result of the verification is displayed on the verification display 16, and informs the writer or the person administering the test that either access is granted (in the case of positive verification), or requests the writer to provide another signature (in the case of negative verification). In the practice of the present invention, no pictorial representation of a signature is needed, thereby avoiding even the basis for a forgery attempt of the signature.

The signal that represents the information from the signature making is a time vector function of the force transmitted from the hand to the scriber and, in practice, is provided by sensors of pressure and acceleration or velocity along coordinate axes. It has been noted that the signals from the signatures of the same person appear to vary in time and suffer from time distortions. It is a premise of the present invention that the time distortions of the signals must be eliminated prior to correlation function analysis in order to establish signal matching. This is accomplished by using a number of steps.

First of all, the to-be-compared and reference signatures, or other written data signals, are reduced to the same time scale to achieve the same average velocity of signing. In this case, the compared signals are considered on the same time scale for the scriber-media contact period.

Secondly, the time distortions related to the phase shifts are eliminated by using the "sliding window" method. As detailed herein, a so called "sliding window" is used to localize time distortions. In order to understand the "sliding window" method, and without loss of generality, suppose we take a window of $\Delta t_w$ size on the reference signal, and move that window along the to-be-verified signal for an appropriate interval, usually, ±15% of the window size, computing the cross-correlation function between the window and the corresponded part of to-be-verified signal until the position of the maximum value of cross-correlation function is found. In the experiments detailed herein, a window of 0.5 sec. equal to 100 points of signal length was used with a step of 0.1 sec. (20 points) length.

The cross-correlation function $w_j(\tau)$ for window "j" is defined as follows:

$$w_j(\tau) = 1/\text{norm}_{wj} * \sum_{t=j}^{t=j+\Delta t_w-1} v(t)_w * v(t+\tau)_s,$$

where
$\text{norm}_{wj}$ is $\sqrt{(D_w * D_s)}$, and $D_w$ and $D_s$ are dispersions of a window and of the matching piece of the to-be-verified signal, correspondingly;
$v(t)_w$—piece of the reference signal representing a current window;
$v(t+\tau)_s$—piece of to-be-verified signal, corresponding to a current window;
$\Delta t_w$, is the window size;
$j=1,2,\ldots,n$, is the window number.

It is therefore seen that this unique method of sliding window makes it possible to establish the mapping between coincident regions of the reference signal and of the to-be-verified signal to eliminate relative phase shifts between signal parts.

Mapping is used as a procedure to establish correspondence between a set of points of a reference signal and of its counterpart on the to-be-verified signal with respect to phase distortions.

The mapping is done as follows. Each difference between shifts of two sequential windows is compensated by cutting out the number of points equal to this difference of the middle of the corresponding window. In the case of increasing shift, the corresponding piece of the signal is ignored on the to-be-verified signal, and in the case of decreasing shift, the corresponding piece of the reference signal is ignored. It is noted that sharp changes in the shift value indicate regions of time distortion.

Now, after compensation of both frequency and phase distortions, the correlation function analysis can be applied to the pair of stationary signals, i.e. to the pair of a reference signal and of a mapped to-be-verified signal.

The cross-correlation function $F(\tau)$ is evaluated as follows:

$$F(\tau) = 1/\text{norm} * \sum_{t_b}^{t_e} v(t+t_0)_r * v(t+\tau)_s,$$

where
norm is $1/\sqrt{D_r * D_s}$, and $D_r$ and $D_s$ are dispersions of reference and to-be-verified signals, correspondingly;
$v(t+t_0)_r$ and $v(t+\tau)_s$ are centered reference and to-be-verified signals, correspondingly;
$t_b$, $t_e$—are the parameters of reference signal vector.

Shown in FIG. 2 are two signatures 22 and 23 of the same person. The corresponding digital signals from these two signatures are shown in FIG. 4. The signals represent magnitudes of the scriber acceleration:

$$v(t) = \sqrt{(a_x(t)^2 + a_y(t)^2)},$$

where $a_x(t)$ and $a_y(t)$ are accelerations along axis X and Y, respectively.

Elimination of time distortions results in an essential increase of maximum value of cross-correlation function. For the signatures in FIG. 4, it increases from 0.67 before elimination up to 0.91 after that. It is one of the key premises of the present invention that the elimination of time distortions provides an essential improvement in the level of verification reliability.

Figure 6A:
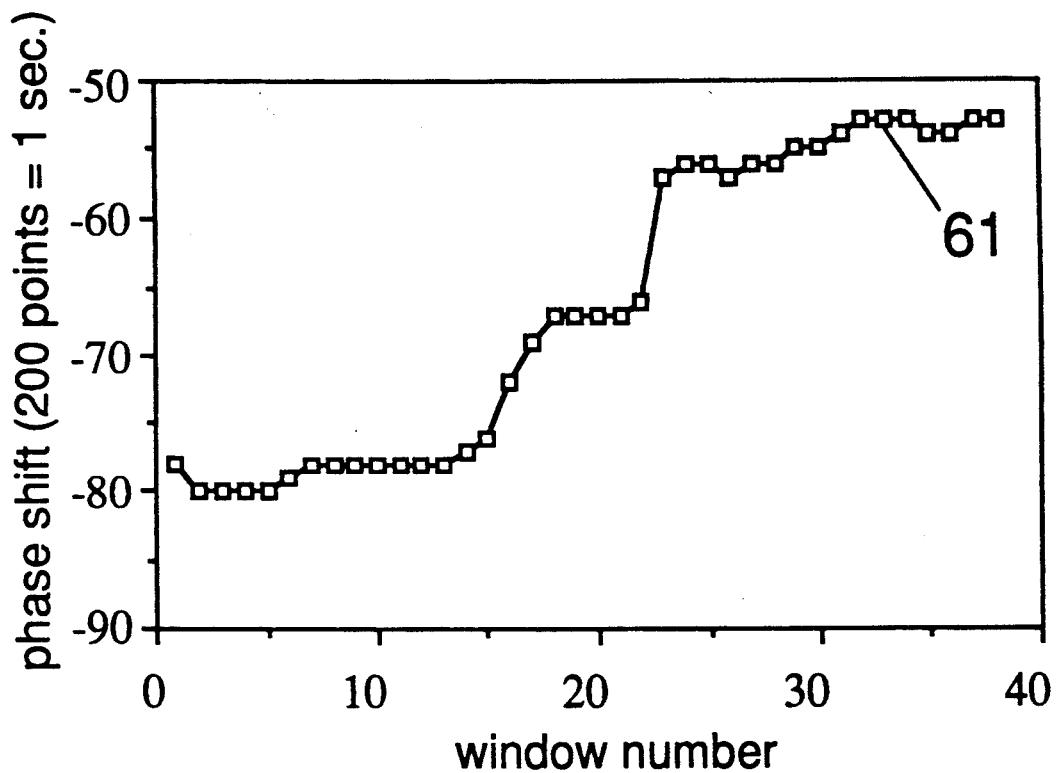
FIGS. 6a and 6b show graphs of sliding window shift for magnitude of acceleration with respect to the window number for the pair of authentic signature signals in FIG. 4, and for the pair of a real and forged signature signals in FIG. 5, respectively.
Figure 6B:
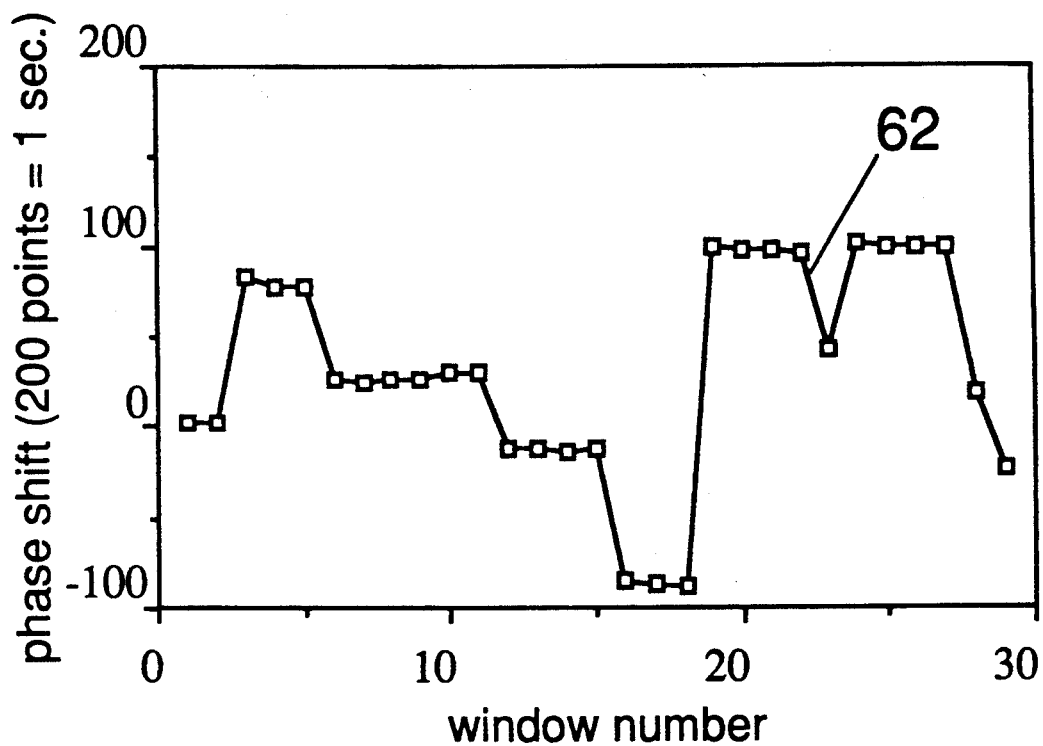

The sliding window technique of the present invention provides a powerful method for signature verification, and therefore, forgery detection and rejection. FIG. 6b shows the shift of sliding window at which the cross-correlation functions have its maxima as function of the window number for the case of a free hand forgery 32 shown in FIG. 3. The signal which represents the magnitude of the scriber acceleration for this case 52, is shown in FIG. 5.

Figure 6C:
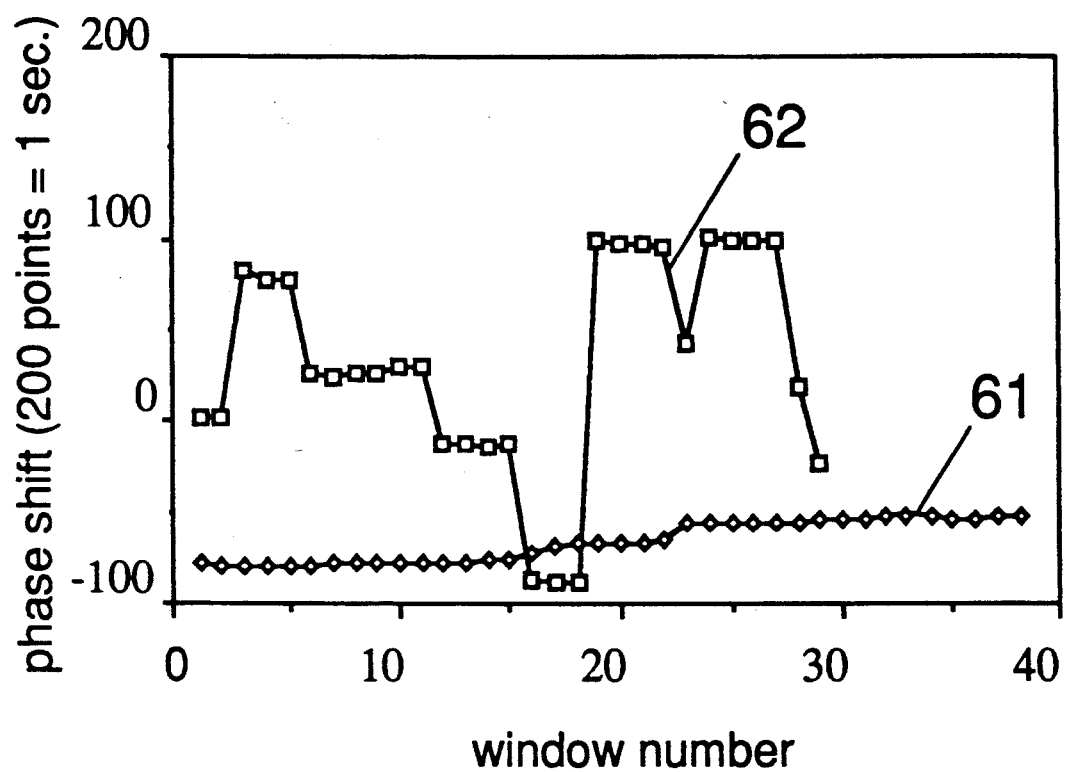
FIG. 6c shows sliding window shift for both cases in the same scale along shift axis.

The oscillating character of the graph in FIG. 6b shows that the signals from the signatures of the authentic person and the signals from the forger clearly have absolutely different dynamics in the process of signing. FIG. 6c, where the both graphs 6a, and 6b are plotted in the same shift scale exposes this difference evidently.

This visual perception can be easily formalized by computing a histogram of the first order differences normalized to the window step value, which characterizes quantitatively differences of shifts for the each pair of adjoined windows as follows:

$$\Delta \tau_{max} = 1/\Delta t_{w\_step} * (\tau_{max}(j+1) - \tau_{max}(j)),$$

where
$\tau_{max}(j)$—shift of window "j" at which maximum of cross-correlation function is achieved;
$\Delta t_{w\_step}$—window step.

Figure 7A:
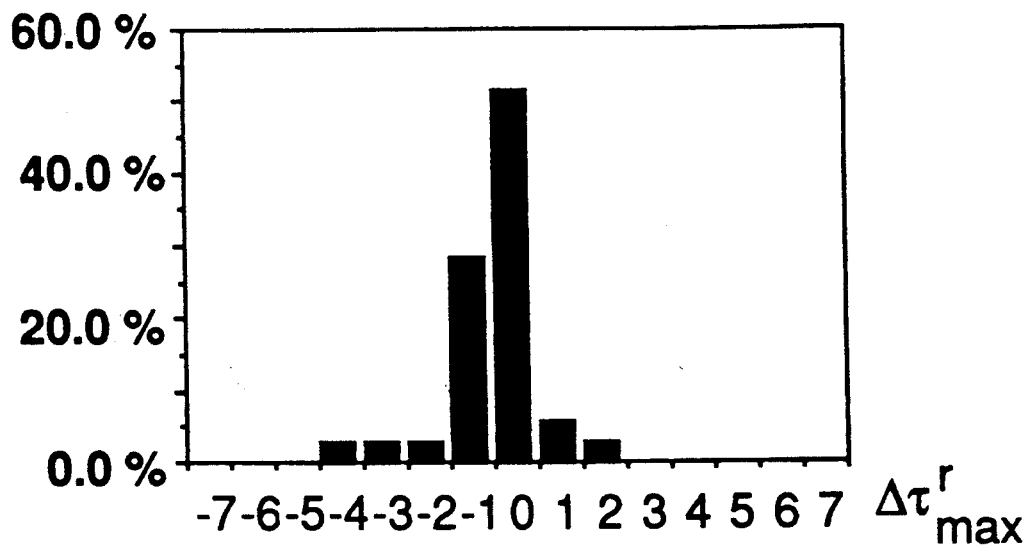
FIGS. 7a and 7b show histograms of the first order difference $\Delta\tau_{max}$ for the pair of authentic signature signals shown in FIG. 4, and for the pair of the real signature signal and the signal of the free hand forgery in FIG. 5, respectively.

For the pair of authentic signatures of the same signer, the histogram in FIG. 7a shows that about 90% of all $\Delta\tau_{max}$ are concentrated in the very narrow interval, around zero or neighborhood $$-3 \leq \Delta\tau \leq +3.$$

Figure 7B:
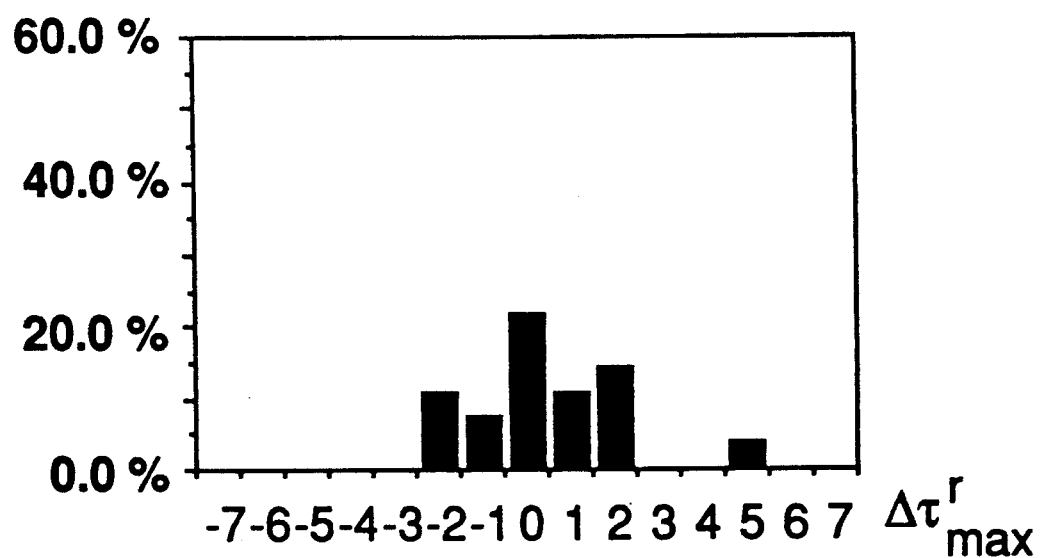

By comparison, for the case of the forgery, the histogram shown in FIG. 7b has a relatively spread character with less than 60% of all $\Delta\tau_{max}$ concentrated in the zero neighborhood. It is thus shown that the portion of $\Delta\tau_{max}$ values in the zero neighborhood is a criterion referred to as $Cr_2$, and can be used as a measure for establishing authenticity of a signature or other written material by comparing with predetermined threshold value.

Another powerful criterion for forgery detection which is provided by the sliding window technique of the present invention is a measure of conformity between the window phase shifts for the different vector components of the signal pair. That is, the relative window phase shifts should conform with each other for two different vector components of signature signals, say for acceleration along axis X and acceleration along axis Y.

Figure 8A:
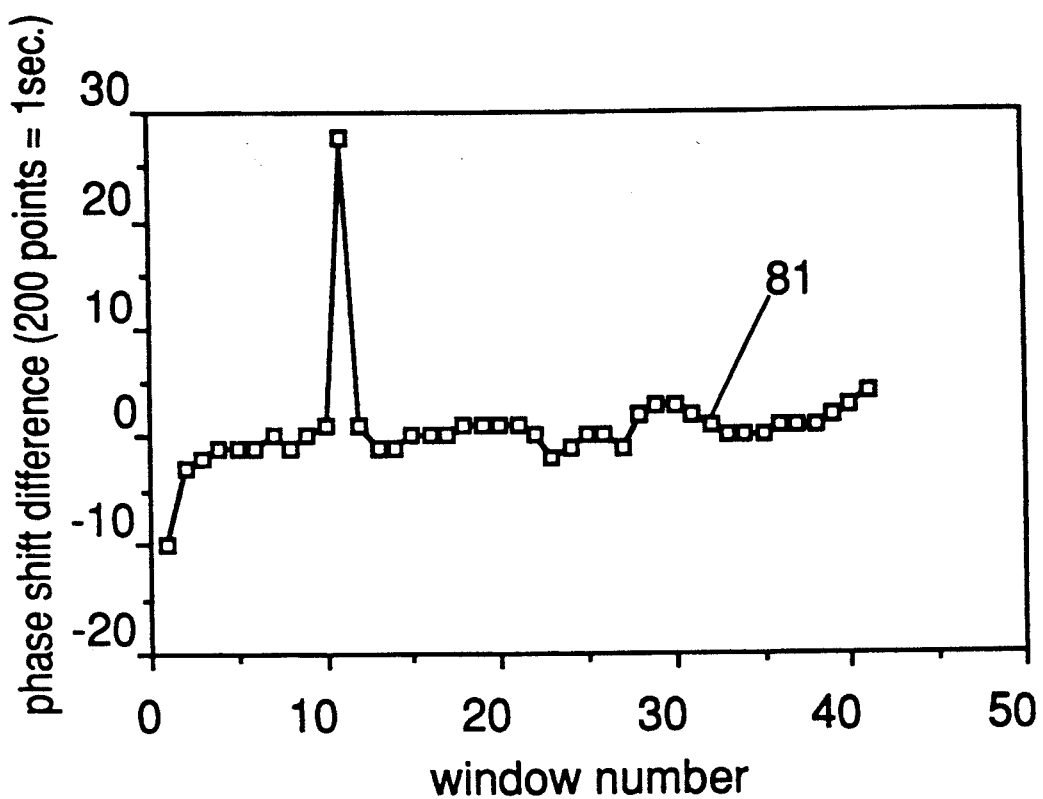
FIGS. 8a and 8b show window shift difference between components X and Y of acceleration with respect to the window number for the pair of authentic signatures in FIG. 2, and for the pair of authentic and forged signatures in FIG. 3, respectively.
Figure 8B:
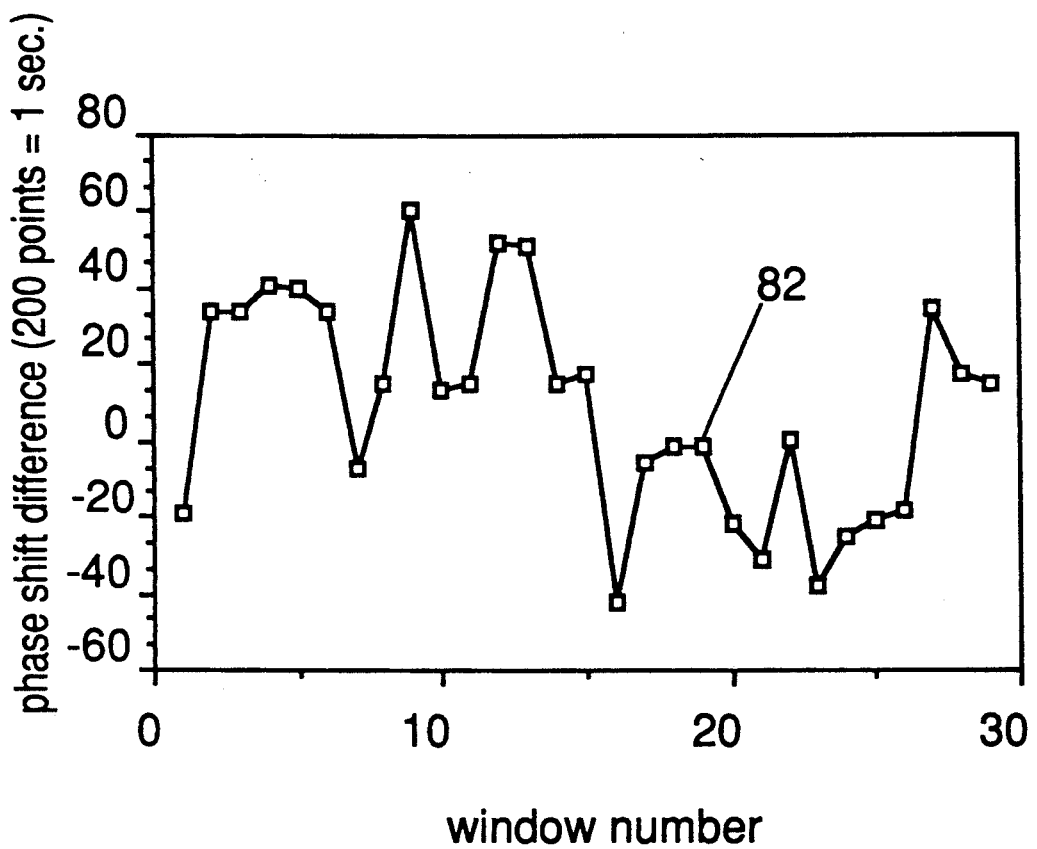
Figure 8C:
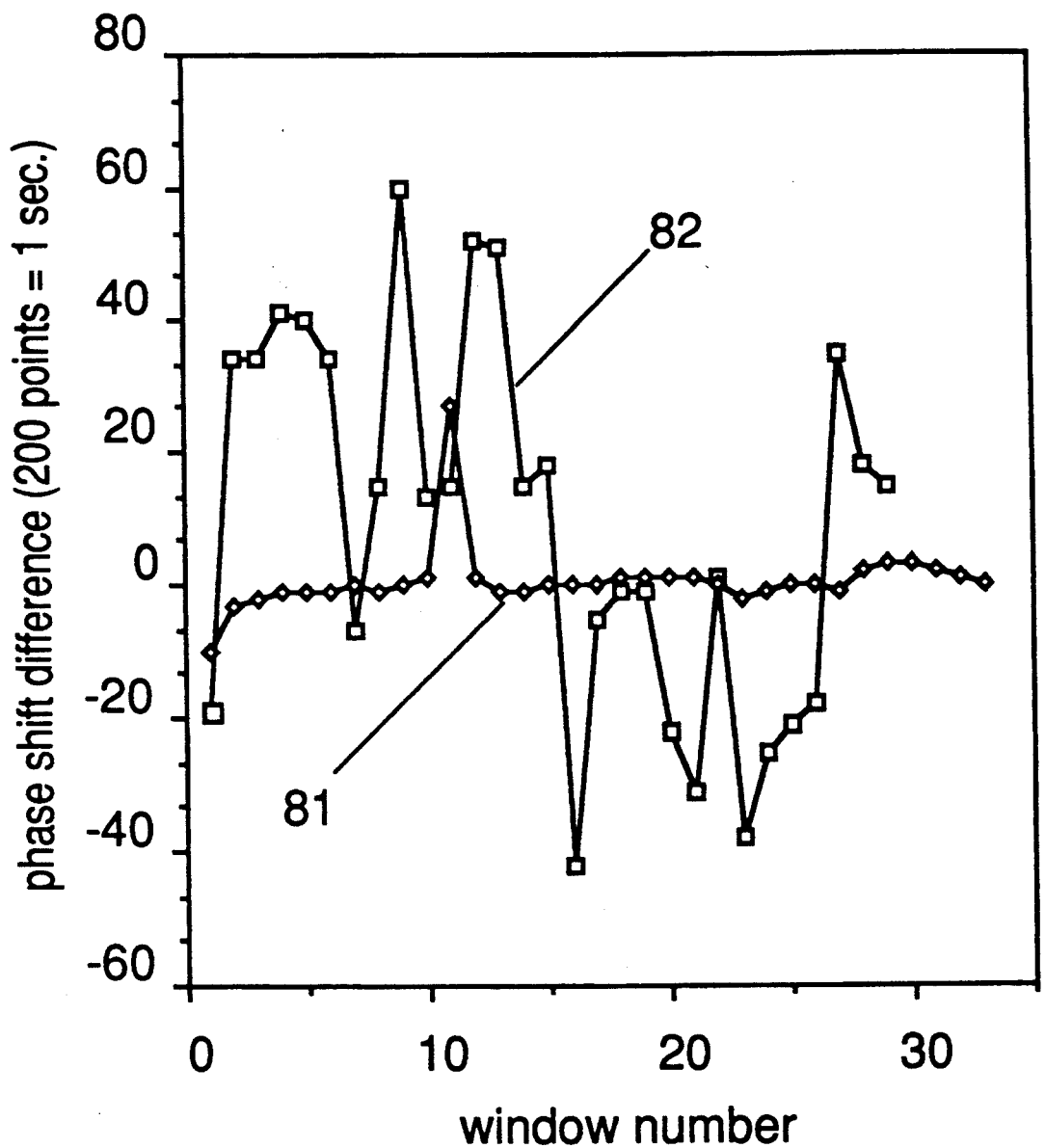
FIG. 8c shows window shift difference for both cases in the same scale along shift axis.

As it is known in the art, the true signature and the forgery, being very similar in pictorial representation, differ significantly in thickness of the signed lines which reflects considerably different dynamics with respect to differences in horizontal and vertical movements in the case of true signature making and forgery making. This information is partially used by experts for visual examination of signature authenticity. The present invention utilizes this dynamic information in full and guarantees by then the reliable examination of signature authenticity. These differences easily become apparent by using the conformity measure between the window phase shifts for different components of the of the signal vector. In the case of the comparison of two authentic signatures, given for instance, accelerations along axes X and Y, the graphs of phase shift differences along axes X and Y mostly coincide, FIG. 8a while for the pair of authentic and forged signatures, the graph has completely chaotic character, FIG. 8b. FIG. 8c shows both graphs in the same scale.

Another histogram which is used as a part of verification algorithm represents the distribution of the differences of the shift along axes X and Y where the corresponding window cross-correlation function achieve their maxima:

$$\Delta \tau^{xy}{}_{max} = \tau^{x}{}_{max} - \tau^{y}{}_{max},$$

where $\tau^{x}{}_{max}$ is the shift of window at which maximum of cross-correlation function is achieved for X component of vector;

$\tau^{y}{}_{max}$ is the shift of window at which maximum of cross-correlation function is achieved for Y component of vector.

Figure 9A:
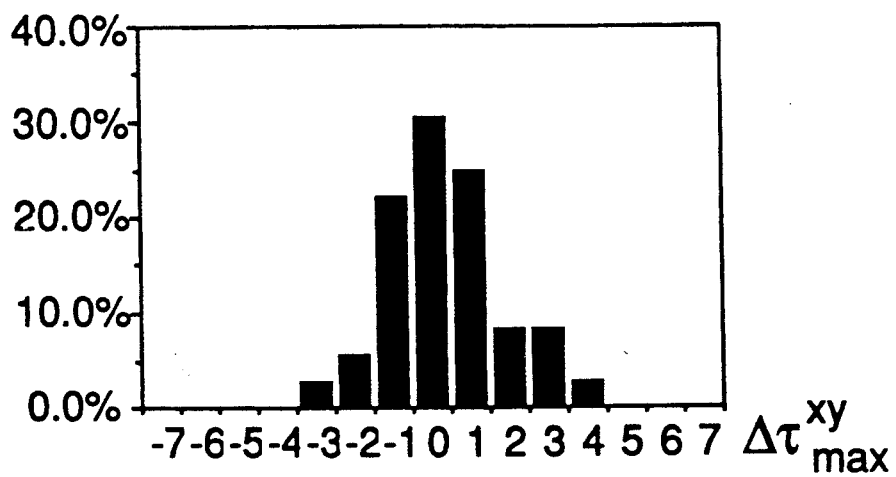
FIGS. 9a and 9b show histograms of the shift difference $\Delta\tau^{xy}_{max}$ between window shifts determined for X and Y components of scriber acceleration for the pair of authentic signature signals shown in FIG. 4, and for the pair of the authentic signature signal and the forged signature signal in FIG. 5, respectively.
Figure 9B:
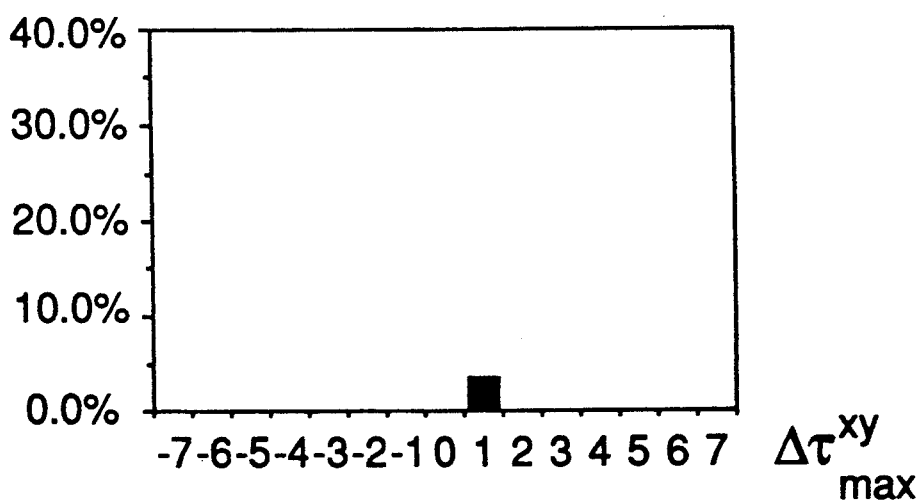
Figure 10:
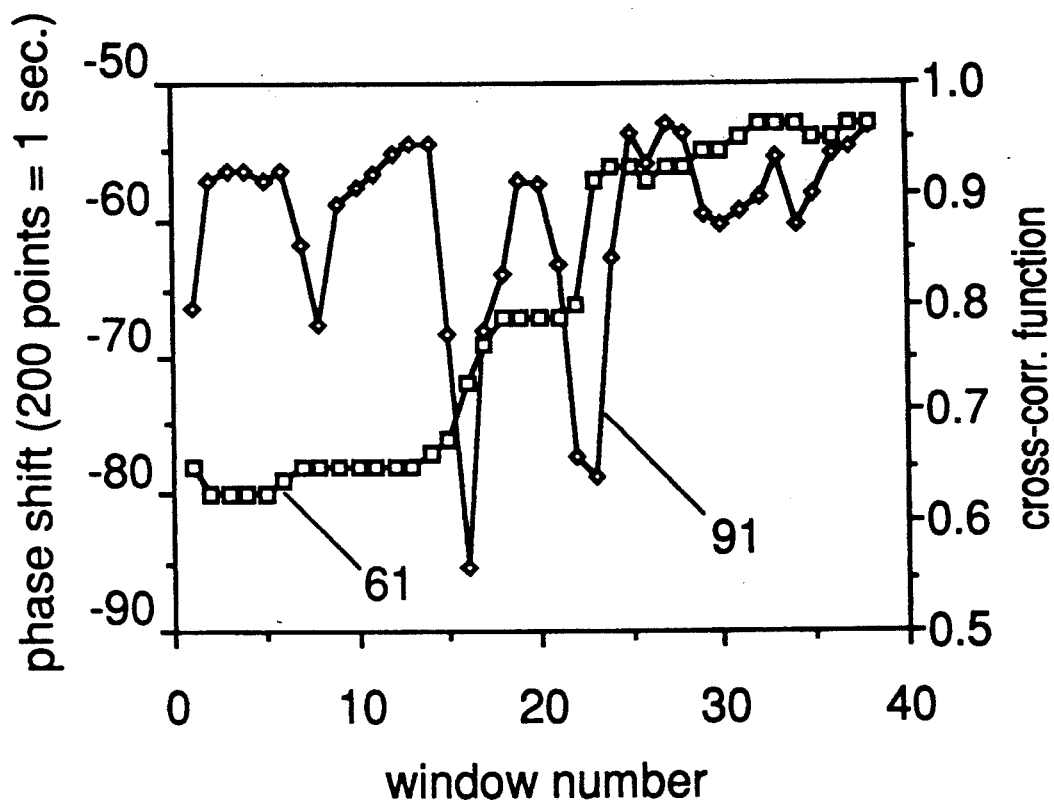
FIG. 10 shows behavioral matching of the phase shift 61 given in FIG. 6a, and window cross-correlation function maximum values 91 with respect to the window number for the signature signals in FIG. 4.

Here, the present invention exploits the fact that time distortions identified by the sliding window method should coincide with each other along all the axes for the signature signals of the same person, and would be expected to differ significantly in the case of forgery. Where there is a high rate coincidence, the typical histogram is shown in FIG. 9a, which is again characterized by high density of $\Delta \tau^{xy}{}_{max}$ in the zero neighborhood. In this region, there are about 95% of all shifts for the pair of the authentic signatures. By comparison, for a forgery, there are less than 4% of shifts for the pair of authentic and forged signatures, as shown in FIG. 9b.

The histogram for shift differences provides another criterion that referred to as $Cr_3$ or values in the zero neighborhood is used as another measure for establishing signature authencity by comparing it with the corresponding threshold value.

These two above mentioned criteria, which are based on two kinds of shift histograms, and the cross-correlation function criterion applied to the pair of indivisible reference and to-be-verified signature signals preprocessed to a stationary pair with the frequency and the phase coincidence represent two faces of signature verification algorithm.

Analysis of the histograms for $\Delta \tau_{max}$ and $\Delta \tau^{xy}{}_{max}$ and the cross-correlation function analysis can be implemented sequentially as a system of implications, or in parallel as a conjunction of the conditions, for the different applications.

In both cases, whether a parallel or sequential approach is used, signature verification is positive when the criterion for each of three steps of analysis is satisfied. Otherwise verification is negative and authenticity of the signer is rejected.

In addition to use of correlation analysis for single signal components we exploit correlation function determination applied for multidimensional signal as well.

In this case, cross-correlation function for two signals with components $x_r(t), y_r(t)$ and $z_r(t)$ for reference signature signals, and $x_s(t), y_s(t)$ and $z_s(t)$ components for the to-be-verified signature signals is represented by square cross-correlation matrix $K_{rs}$:

$$K_{rs} = \begin{bmatrix} K_{xx} & K_{xy} & K_{xz} \\ K_{yx} & K_{yy} & K_{yz} \\ K_{zx} & K_{zy} & K_{zz} \end{bmatrix},$$

where $K_{ij}$ is a cross-correlation function evaluated for i component of the reference vector and j component of the to-be-verified vector.

This functional matrix is reduced to the numerical one by substituting each function by its maximum value. A choice of a trace of the matrix or a norm of the matrix is allowed as a similarity measure to establish authenticity of the signature. The to-be-verified signature is accepted or rejected depending on the similarity measure is over or under the appropriate threshold.

While the invention has been particularly shown, described and illustrated in detail with reference to preferred embodiments and modifications thereof, it should be understood by those skilled in art that the foregoing and other modifications are exemplary only, and that equivalent changes in form and detail may be made therein without departing from the true spirit and scope of the invention as claimed, except as precluded by the prior art.

The embodiments of the invention in which an exclusive property or privilege is claimed are defined as follows:

1. A machine method of on-line handwritten signature verification based on the dynamics of a reference signature and of a to-be-verified signature in accordance with one or more selected threshold value, including the steps of:

a. gathering a set of reference analog dynamic signals related to scriber movement for handwritten reference signatures during the process of reference signature making, such signals being selected from the group consisting of forces transmitted from the hand of the writer to the scriber, scriber acceleration, scriber velocity, and mixtures thereof, all as functions of time;

b. converting the reference analog dynamic signals from analog to digital form, and storing the resulting reference digital signals in a file of reference digital signals for retrieval therefrom;

c. gathering a set of to-be-verified analog dynamic signals related to scriber movement for a to-be-verified handwritten signature during the process of to-be-verified signature making, such signals to be selected from the group consisting of forces transmitted from the hand of the writer to the scriber, scriber acceleration, scriber velocity, and mixtures thereof, all as functions of time;

d. converting the to-be-verified analog dynamic signature signals from analog to digital form;

e. providing a pair of digital signals, said digital signal pair being composed of the to-be-verified digital signals and one of the reference digital signals taken from the reference signal file, with which it is to be compared;

f. processing the data pair of digital signals to eliminate time distortions between them utilizing the steps of:

i. using a sliding window to find phase shift locations, and thereby establishing the mapping between phase coincident areas of a reference digital signal and of the to-be-verified digital signals;

ii. eliminating phase shift distortions between the reference digital signal and of the to-be-verified digital signal by the use of the mapping procedure of step f. ii.;

g. determining the similarity of a pair of reference and to-be-verified signatures utilizing the steps of:

i. evaluating the cross-correlation matrix $K_{rs}$ from step f. ii., with each element $K_{ij}$ representing the maximum value of the corresponding cross-correlation function for each pair of x, y and z components of digital signal vector;

$$K_{rs} = \begin{bmatrix} K_{xx} & K_{xy} & K_{xz} \\ K_{yx} & K_{yy} & K_{yz} \\ K_{zx} & K_{zy} & K_{zz} \end{bmatrix}$$

ii. utilizing information in said matrix to produce a measure, said measure being determined using a method selected from the method of calculating a trace of the matrix and the method of calculating a norm of the matrix;

iii. using the measure as determined by step g.ii., and comparing it with an appropriate threshold in order to produce a non-rejection or rejection message of the authenticity of to-be-verified signature, as a criterion $Cr_1$;

iv. determining distribution of phase distortion for windows by constructing a histogram of the first order shift differences obtained from the application of the sliding window method in step f.i.;

v. utilizing the information of said first order shift differences histogram to produce a measure which characterizes the portion of the first order shift differences in the zero neighborhood;

vi. using the measure determined in step g.v. and comparing it with an appropriate threshold in order to produce a message of non-rejection or rejection of authenticity of the to-be-verified signature, as a criterion $Cr_2$;

vii. determining coincidence of phase distortion distributions for two of the different components of the signature signal vectors: X, Y and Z by constructing histogram of the shift differences, obtained from application of window method in step f.i., for each component by comparing their shift histograms;

viii. utilizing the information of said shift differences histogram to produce a measure which characterizes the portion of the shift differences for the two considered vector components of the signature signal which values are in the zero neighborhood;

ix. using the measure determined in step g. viii. and comparing it with an appropriate threshold in order to produce a signal of non-rejection or rejection of authenticity of the to-be-verified signature, as criterion $Cr_3$; and then x. computing the verification result using criterion selected from the group consisting of $Cr_1$, $Cr_2$, and $Cr_3$, and combinations thereof;

xi. using the verification result of g.x. to produce a signal of approval or rejection of the authenticity of to-be-verified signature.

2. The method of claim 1 wherein the correlation analysis utilizes a sub-matrix of g.i.

3. The method of claim 1 wherein the information in said matrix is utilized in step g.ii. to determine a trace of the matrix.

4. The method of claim 1 wherein the information in said matrix is utilized in step g.ii. to determine a norm of the matrix.

5. The method of claim 1 wherein determination of the similarity of signatures is based on evaluation of cross-correlation function for a selected component of the signature signals.

6. The method of claim 5 wherein correlation analysis is utilized by evaluating cross-correlation function for the magnitude of the selected components of the signature signals.

7. The method of claim 1, wherein the sliding window method in step f. i. is used to find the position of maximum correlation functions between windows of one signal and the corresponding pieces of the other signal for determination of phase distortion locations.

8. The method of claim 1 wherein the sliding window in step f.i. is a piece of one signal called window which is moved along the signal with a predetermined step of a size which is less than size of the window, and which is used to find for each window the corresponding piece in another signal of the pair on the basis of the position of maximum value of cross-correlation function between them.

9. Apparatus for use in on-line handwritten data verification based on the dynamics of a reference and of a to-be-verified signature signals in accordance with one or more selected threshold values, including in combination:

a. a scriber;

b. means for gathering a set of reference analog dynamic signals related to scriber movement for reference during a process of reference signature making, and analog dynamic signals during a process of to-be-verified signature making, such signals being selected from the group consisting of forces transmitted from the hand of the writer to the scriber, scriber acceleration, scriber velocity, and mixtures thereof, all as functions of time;

c. means for converting the analog reference and to-be-verified dynamic signals from analog to digital form;

d. means for storing the resulting reference digital signals in a file of reference signature signals;

e. means for providing a data pair composed of the digital data of the to-be-verified signal and the digital data of one of the reference file signals with which it is to be compared;

f. means for processing the data pair of digital signals to eliminate time distortions between them utilizing the steps of:

i. using a sliding window method to find phase shift locations, and thereby establishing the mapping between phase coincident areas of a reference digital signal and of the to-be-verified digital signals;

ii. eliminating phase shift distortions between the reference digital signal and of the to-be-verified digital signal by the use of the mapping procedure of step f. i.;

g. means for determining the similarity of a pair of reference and to-be-verified signatures utilizing the steps of:

i. evaluating the cross-correlation matrix from step f. ii. as a numerical matrix with each element representing the maximum value of the corresponding cross-correlation function $K_{rs}$ for each pair of x, y and z components of digital signal vectors;

$$K_{rs} = \begin{bmatrix} K_{xx} & K_{xy} & K_{xz} \\ K_{yx} & K_{yy} & K_{yz} \\ K_{zx} & K_{zy} & K_{zz} \end{bmatrix}$$

ii. utilizing information in said matrix to produce a measure, said measure being determined using a method selected from the method of calculating a trace of the matrix and the method of calculating a norm of the matrix;

iii. using the measure as determined by step g.ii., and comparing it with an appropriate threshold in order to produce a non-rejection or rejection signal of the authenticity of to-be-verified signature, as a criterion $Cr_1$;

iv. determining distribution of phase distortion for windows by constructing a histogram of the first order shift differences obtained from the application of the sliding window method in step f.i.;

v. utilizing the information of said first order shift differences histogram to produce a measure which characterizes the portion of the first order shift differences in the zero neighborhood;

vi. using the measure determined in step g.v. and comparing it with an appropriate threshold in order to produce a message of non-rejection or rejection of authenticity of the to-be-verified signature, as a criterion $Cr_2$;

vii. determining coincidence of phase distortion distributions for two components of the signature signal vectors: X, Y and Z by constructing histogram of the shift differences;

viii. utilizing the information of said shift differences histogram to produce a measure which characterizes the portion of the shift differences for the two considered vector components of the signature signals which values are in the zero neighborhood;

ix. using the measure determined in step g. viii. and comparing it with an appropriate threshold in order to produce a signal of non-rejection or rejection of authenticity of the to-be-verified signature as criterion $Cr_3$; and then x. means for computing the verification result using criterion selected from the group consisting of $Cr_1$, $Cr_2$, and $Cr_3$, and combinations thereof;

xi. means for using the verification result of g.x. to produce a signal of approval or rejection of the authenticity of to-be-verified signature.

10. The method of claim 1 wherein the verification result of step g.x. is computed by determining the conjunction of measures $Cr_1$, $Cr_2$, and $Cr_3$.

11. The method of claim 1 wherein prior to step f.i. the digital signals of the data pair are reduced to the same average velocity to achieve substantial frequency coincidence between signals in the pair.

12. A machine method of on-line handwritten signature verification using on the dynamics of scriber movement while recording a reference signature and a to-be-verified signature in accordance with one or more selected threshold value, including the steps of:

a. gathering a set of analog dynamic reference signals related to movement of the scriber for handwritten reference signatures during the process of reference signature making, such signals being selected from the group consisting of forces transmitted from the hand of the writer to the scriber, scriber acceleration, scriber velocity, and mixtures thereof, all said being measured as functions of time;

b. converting the reference analog dynamic signals from analog to digital form, and storing the resulting reference digital signals in a file of reference digital signals for retrieval therefrom;

c. gathering a set of to-be-verified analog dynamic data signals related to movement of said scriber for a to-be-verified handwritten signature during the process of to-be-verified signature making, such signals to be selected from the group consisting of forces transmitted from the hand of the writer to the scriber, scriber acceleration, scriber velocity, and mixtures thereof, all as functions of time;

d. converting the to-be-verified analog dynamic signature signals to digital form;

e. providing a pair of digital signals, said digital signal pair being composed of the to-be-verified digital signal and one of the reference digital signals taken from the reference signal file;

f. processing the pair of digital signals to eliminate time distortions between them utilizing the steps of:

i. using a sliding window to find phase shift locations, and thereby establishing the mapping between phase coincident areas of reference digital signal and of the to-be-verified digital signal;

ii. eliminating phase shift distortions between the reference digital signal and the to-be-verified digital signal by the use of the mapping procedure of step f. i.;

g. determining the similarity of the pair of reference and to-be-verified signatures using criterion selected from the group consisting of $Cr_1$, $Cr_2$, and $Cr_3$, and combinations thereof:

wherein $Cr_1$ is determined by:

i. evaluating the cross-correlation matrix $K_{rs}$ based on data from step f. ii., with each element representing the maximum value of the corresponding cross-correlation function for each pair of x, y and z components of digital signal vectors;

$$K_{rs} = \begin{bmatrix} K_{xx} & K_{xy} & K_{xz} \\ K_{yx} & K_{yy} & K_{yz} \\ K_{zx} & K_{zy} & K_{zz} \end{bmatrix}$$

ii. producing a measure from the matrix, said matrix being created using a method selected from the method of calculating a trace of the matrix and the method of calculating a norm of the matrix;

iii. comparing the measure as determined by step g.ii., with an appropriate threshold in order to produce a non-rejection or rejection signal of the authenticity of the to-be-verified signature, as a criterion $Cr_1$;

wherein $Cr_2$ is determined by:

i. determining distribution of phase distortion for windows by constructing a histogram of the first order shift differences obtained from the application of the sliding window method in step f. i;

ii. utilizing the information of said first order shift differences histogram to produce a measure which characterizes the portion of the first order shift differences in the zero neighborhood;

iii. using the measure determined in previous step ii and comparing it with an appropriate threshold in order to produce a signal of non-rejection or rejection of authenticity of the to-be-verified signature, as a criterion $Cr_2$;

wherein $Cr_3$ is determined by:

i. determining coincidence of phase distortion distributions for two components of the signature signal vectors: X, Y and Z by constructing histogram of the shift differences obtained from the application of the sliding window method in step f.i;

ii. utilizing the information of said shift differences histogram to produce a measure which characterizes the portion of the shift differences for the two considered vector components of the signature signal which values are in the zero neighborhood;

iii. comparing the measure determined in previous step ii. with an appropriate threshold in order to produce a signal of non-rejection or rejection of authenticity of the to-be-verified signature as criterion $Cr_3$; and then h. using the determination of similarity from g., to produce a signal of approval or rejection of the authenticity of to-be-verified signature.

13. Apparatus for use in on-line handwritten data verification using the dynamics of the scriber movement while recording a reference and a to-be-verified signature signals in accordance with one or more selected threshold values, including in combination:

a. a scriber;

b. means for gathering a set of reference analog dynamic signals related to movement of the scriber during the process of reference signature making and during a process of to-be-verified signature making, such signals being selected from the group consisting of forces transmitted from the hand of the writer to the scriber, scriber acceleration, scriber velocity, and mixtures thereof, all as functions of time;

c. means for converting the analog reference and to-be-verified dynamic signals from analog to digital form;

d. means for storing the resulting reference digital signals in a file of reference digital signals;

e. means for providing a data pair composed of the digital data of the to-be-verified signal and the digital data of one of the reference file signals;

f. means for processing the data pair of digital signals to eliminate time distortions between them utilizing the steps of:

i. using a sliding window to find phase shift locations, and thereby establishing the mapping between phase coincident areas of a reference digital signal and of the to-be-verified digital signal;

ii. eliminating phase shift distortions between the reference digital signal and the to-be-verified digital signal by the use of the mapping procedure of step f.i.;

g. means for determining the similarity of the pair of reference and to-be-verified signatures using criterion selected from the group consisting of $Cr_1$, $Cr_2$, and $Cr_3$, and combinations thereof:

wherein $Cr_1$ is determined by:

i. evaluating the cross-correlation matrix $K_{rs}$ based on data from step f. ii., with each element representing the maximum value of the corresponding cross-correlation function for each pair of x, y and z components of digital signal vectors;

$$K_{rs} = \begin{bmatrix} K_{xx} & K_{xy} & K_{xz} \\ K_{yx} & K_{yy} & K_{yz} \\ K_{zx} & K_{zy} & K_{zz} \end{bmatrix}$$

ii. producing a measure from the matrix, said measure being created using a method selected from the method of calculating a trace of the matrix and the method of calculating a norm of the matrix;

iii. comparing the measure as determined by step g.ii., with an appropriate threshold in order to produce a non-rejection or rejection signal of the authenticity of the to-be-verified signature, as a criterion $Cr_1$;

wherein $Cr_2$ is determined by:

i. determining distribution of phase distortion for windows by constructing a histogram of the first order shift differences obtained from the application of the sliding window method in step f. i;

ii. utilizing the information of said first order shift differences histogram to produce a measure which characterizes the portion of the first order shift differences in the zero neighborhood;

iii. comparing the measure determined in previous step ii. with an appropriate threshold in order to produce a signal of non-rejection or rejection of authenticity of the to-be-verified signature as a criterion $Cr_2$;

wherein $Cr_3$ is determined by:

i. determining coincidence of phase distortion distributions for two components of the signature signal vectors: X, Y and Z by constructing histogram of the shift differences;

ii. utilizing the information of said shift differences histogram to produce a measure which characterizes the portion of the shift differences for the two considered vector components of the signature signal which values are in the zero neighborhood;

iii. comparing the measure determined in previous step ii. with an appropriate threshold in order to produce a signal of non-rejection or rejection of authenticity of the to-be-verified signature as criterion $Cr_3$; and h. means for using the determination of similarity from g., to produce a signal of approval or rejection of the authenticity of a to-be-verified signature.

* * * * *